United States Patent [19]

Ulrichs et al.

[11] Patent Number: 4,699,773

[45] Date of Patent: Oct. 13, 1987

[54] PROCESS AND APPARATUS FOR THE PREPARATION OF AMMONIUM NITRATE

[75] Inventors: Klaus Ulrichs; Joseph Hibbel; Volkmar Schmidt, all of Oberhausen; Bernhard Lieder, Bottrop; Heinrich Scheve, Oberhausen; Burchard Schulze-Frenking, Dorsten; Wolfgang Höfs; Jürgen Nottebohm, both of Oberhausen, all of Fed. Rep. of Germany

[73] Assignee: Ruhrchemie Aktiengesellschaft, Fed. Rep. of Germany

[21] Appl. No.: 687,116

[22] Filed: Dec. 28, 1984

[30] Foreign Application Priority Data

Dec. 29, 1983 [DE] Fed. Rep. of Germany ....... 3347404

[51] Int. Cl.$^4$ ............................................... C06B 1/04
[52] U.S. Cl. .................................. 423/396; 422/112; 422/113
[58] Field of Search ............... 423/395, 396; 422/112, 422/113

[56] References Cited

U.S. PATENT DOCUMENTS

| | | | |
|---|---|---|---|
| 2,089,957 | 8/1937 | Harris et al. | 423/396 |
| 2,551,569 | 5/1951 | Strelzoff | 423/395 |
| 2,974,130 | 3/1961 | Moberly | 422/112 |
| 3,085,000 | 4/1963 | Lupfer | 423/396 |
| 3,146,075 | 8/1964 | Robb et al. | 422/113 |
| 3,174,824 | 3/1965 | Lupfer | 423/396 |
| 3,297,412 | 1/1967 | Phillips et al. | 422/112 |
| 3,451,785 | 6/1969 | Rohlfing et al. | 422/113 |
| 3,579,297 | 5/1971 | Ekblom | 423/396 |

FOREIGN PATENT DOCUMENTS

| | | | |
|---|---|---|---|
| 532677 | 11/1956 | Canada | 423/396 |
| 1492779 | 5/1965 | France | 423/396 |
| 367660 | 2/1932 | United Kingdom | 423/396 |
| 1028202 | 5/1966 | United Kingdom | 423/395 |
| 1105466 | 3/1968 | United Kingdom | 423/395 |
| 123150 | 2/1959 | U.S.S.R. | 423/395 |
| 191498 | 8/1962 | U.S.S.R. | 423/396 |
| 392947 | 7/1971 | U.S.S.R. | 422/112 |

Primary Examiner—John Doll
Assistant Examiner—Wayne A. Langel
Attorney, Agent, or Firm—Bierman & Muserlian

[57] ABSTRACT

A process for the preparation of ammonium nitrate by the reaction of nitric acid with ammonia in two stages at elevated temperature, in which the first stage is carried out at elevated pressure and the second stage is carried out at atmospheric pressure. The heat of neutralization released in the first stage is used to vaporize a portion of the reactor contents, the remaining heat of reaction being utilized to produce steam. The vapor leaving the first stage develops a pressure which controls the valve regulating the amount of heat recovered by steam generation. The valve is opened when the pressure of the vapor exceeds a set value, usually in the range of 3.4 to 4.8 bars. Decomposition products of ammonium nitrate are also measured and override the pressure regulated control of the proporiton of heat recovered by steam generation, so as to maintain ammonium nitrate decomposition within acceptable limits. An apparatus for carrying out the process is also disclosed.

3 Claims, 1 Drawing Figure

PROCESS AND APPARATUS FOR THE PREPARATION OF AMMONIUM NITRATE

This application claims the priority of German Application No. P 33 47 404.4, filed Dec. 29, 1983.

The present invention relates to a process for the preparation of ammonium nitrate by reacting nitric acid and ammonia, as well as an apparatus for the recovery of the heat of reaction released therefrom. The heat of neutralization released during the reaction is recovered in part by vaporizing a portion of the reactor contents and in part by heat exchange to a separate and independent system for heat removal. The vapor released from the reactor is used both to regulate the relative proportion of heat recovered by the two methods and to further concentrate the resulting reaction product (ammonium nitrate) solution.

It is well known that, when aqueous nitric acid is reacted with gaseous or liquid ammonia, an aqueous ammonium nitrate solution is formed. The concentration of the solution depends upon the concentrations of the two reactants. This reaction is strongly exothermic, releasing 34.8 kcal/mole (145.7 kJ/mole) in the process. Since such a large amount of heat is released, many attempts have been made to recover the heat for use elsewhere or in an attempt to further concentrate the ammonium nitrate solution.

The previously known processes for the preparation of ammonium nitrate are of two general types. In the first, nitric acid and ammonia are fed into a reactor at atmospheric pressure or at a pressure between 2 and 3 bars. The reaction conditions, the temperature and concentration of the reactants, are appropriately selected so that the heat released during the reaction results in boiling the ammonium nitrate solution. The net effect is that the ammonium nitrate solution becomes concentrated up to approximately 90% by weight in the reactor itself. When the reactor is operated under a pressure of 2 to 3 bars, the ammonium nitrate solution can be depressurized at a later point and, when the pressure is released, additional liquid vaporizes to yield a solution even more highly concentrated.

The ammonium nitrate solution leaving the reactor in the above situations, reaches a concentration of about 90%. Vapor formed in the reactor has been used to heat the reactants towards the reaction temperature or to concentrate the nitric acid before the reactants are introduced into the reaction vessel.

The above process is advantageous in that it is simple to carry out. Possible decomposition of the ammonium nitrate is avoided by keeping the temperature of the reaction relatively low, up to about 160° C. However, these reaction schemes are disadvantageous because the released heat of reaction is poorly utilized. The vapor emerging from the reactor does not have a temperature great enough to concentrate the ammonium nitrate melt to more than 90%. In order to achieve concentrations of the melt of about 95% by weight or more, additional external steam is necessary.

The second group of known processes operates at higher pressures and temperatures than the first. These pressures are in excess of 3 bars and the temperatures are in excess of 160° C. An ammonium nitrate solution is formed in the reactor at concentrations of 70% to 80% by weight. Vapor developed in the reactor is released and utilized to further concentrate the depressurized ammonium nitrate solution emerging from the reactor. While concentrated ammonium nitrate solutions can be obtained, there are substantial disadvantages to such processes. The vapor released is always contaminated with ammonium nitrate and ammonia. This contamination severely limits the usefulness of the vapor in other chemical processes. Furthermore, due to the ammonia content, the condensed vapors result in a polluting solution which requires additional equipment for treating the waste water before it can be discharged into the environment.

A process for the preparation of ammonium nitrate is described in DAS 11 97 857. This process is based on the reaction of at least 60% nitric acid with water-free ammonia. The reaction pressure is between 1 and 4 kg/cm$^2$ (0.981 to 3.924 bars) and the reaction temperature is between 145° and 160° C. There is no appreciable concentration of the reaction mixture by vaporization. The heat of reaction is recovered by converting water into pure steam via a heat exchanger located in the reactor. The steam is partly used to concentrate the ammonium nitrate solution in a vaporizer operated at reduced pressure. The solution is depressurized and vapor is formed at the expense of the heat of the solution. The heat exchanger located in the vaporizer is heated by about 3 kg/cm$^2$ (2.943 bars) of the pure steam recovered by the heat exchanger in the reactor.

A two stage process for the manufacture of ammonium nitrate is set forth in French Application No. 15 74 094. In the first stage, 95% to 99.75% of the nitric acid used is neutralized. Part of the reaction mixture is continually drawn off to a second neutralization stage. Both neutralization stages always operate at the same pressure, which is between 1 and 10 bars. Nitric acid is used in this process at concentrations of 40% to 70% by weight. The heat of reaction causes the mixture to boil, which aids circulation and concentration of the solution. Vapor formed during this process is drawn off at the reactor head.

As is well known, reaction conditions vary and cannot be kept permanently at constant levels during continuous operations. External influences, such as fluctuations in temperature and concentration of the feed materials, result in deviations from optimum conditions. These factors must be taken into account if one is to obtain maximum utilization of the reaction heat for use elsewhere, as well as to create sufficient vapor so as to properly concentrate the ammonium nitrate solution.

It is an object of the invention to provide a process for the preparation of ammonium nitrate which avoids the above mentioned disadvantages and permits the full utilization of the heat of reaction, regardless of fluctuations in operating conditions. It is a further object of the invention to provide an apparatus in which such efficient heat recovery can be carried out.

The above objects are surprisingly achieved by a relatively self-regulating process wherein the reaction is carried out in two stages at elevated temperatures; the vaporization of the ammonium nitrate melt which is formed, and the recovery of heat through an independent heat exchange and recovery. The neutralization reaction takes place in the first stage at an elevated pressure. In the second stage, it occurs at a pressure which is below that of the first stage, preferably atmospheric pressure. The heat of reaction released in the first stage is partially drawn off via a heat exchanger, thereby regulating the temperature within the reactor.

Some of the heat released vaporizes a portion of the contents of the reactor, thereby developing a pressure.

When this latter pressure varies from the set pressure for the reactor, advantageously in the range of 3.4 to 4.8 bars, a control mechanism is actuated so that the heat exchanger in the reactor exchanges more or less heat depending on the reactor conditions. When the heat exchange control is closed, the reactor temperature increases, resulting in further vaporization and, consequently, increasing the pressure in the reactor. Upon reaching and exceeding the set pressure level, the heat exchanger control opens and allows additional heat to be removed from the reactor so that the reactor temperature drops and less vapor is produced, thereby reducing the pressure therein.

In the present two stage process, 95% to 99.8% by weight of the nitric acid used is neutralized with ammonia in the first stage. The ammonia and nitric acid are intimately mixed in the reactor, preferably with recycled ammonium nitrate previously formed. The reaction temperature of the first stage is about 172° to about 185° C.

As the mixture flows through the reactor, it releases heat to the heat exchanger therein. The heat exchanger is operated with any suitable medium for the removal of heat. The heat exchange may or may not involve a phase change of the heat exchange medium, although a water/steam system is preferred. The heat exchange medium, leaving the reactor heat exchanger may develop any suitable pressure, although a pressure of about 3 to about 4 bar is preferable.

Vapor developed in the reactor is released and utilized to operate the control mechanism of the reactor heat exchanger. The vapor released from the reactor is also utilized to warm the reactants or concentrate them prior to their introduction into the reactor. It may be further utilized to concentrate the ammonium nitrate melt produced. Part of the liquid portion left behind is recycled to the reactor to absorb and mix with the reactants. The remainder of the liquid portion is passed on to the second stage.

The second stage of the process begins with a depressurization, which results in the formation of a gas utilizable elsewhere as desired. The pressure of this gas is about the same as that found in the separator and, consequently, about the same as in the first neutralization stage. The liquid remaining behind, having now been depressurized, is reacted with additional ammonia and the result thereof is evaporated to form the desired product.

Throughout the two stage process, the vapor is removed from the reactor after recovering as much heat as possible therefrom, and the decomposition products of ammonium nitrate contained therein are measured. If the preset acceptable level of such decomposition products is exceeded, the pressure control of the heat exchange valve is overridden and the valve opened to quickly reduce the temperature within the reactor. When the level of decomposition products drops below the unacceptable range, the pressure control of the heat exchanger described above is no longer overridden and operates as set forth earlier.

As is readily seen, the instant invention allows for the complete, efficient recovery of the heat of reaction so as to maintain the maximum product output, recover maximum heat, and adjust for variations in reaction conditions at all points in time. Whenever additional heat is necessary to maintain maximum output of product, heat is retained within the reactor; whenever there is excess heat, it is vented off through the heat exchanger. The instant invention allows for instantaneous adjustments without operator intervention.

As will be appreciated by those skilled in the art, the apparatus and process described herein with specific reference to ammonium nitrate production can be readily adapted to any heat producing reaction which can develop sufficient heat to vaporize a portion of the reaction mixture. As heat is generated and vaporization occurs, pressure develops within the reaction zone. This vapor is then released to a device which measures the pressure therein and compares it with a predetermined level. If the level is exceeded, an increased heat exchange takes place, cooling the reaction mixture and drawing off the heat for use elsewhere. When the pressure level is not exceeded, less heat is removed by the heat exchanger.

The heat exchange medium is any one of many known suitable ones. It may be a single phase system involving warmer and cooler liquid or high and low pressure gases or a combination of these. If suitable, particulate heat exchange media may also be employed; however, such particles should be capable of freely flowing. Exchange medium for removing heat for use elsewhere is replaced by either fresh medium or medium recycled after giving up some or all of its heat. The relative proportions of medium recycled from various areas, each potentially having different temperatures or pressures, can be adjusted as desired.

Although many systems are utilizable, a heat exchange system employing a phase change from liquid to gas is preferred. It is also preferred that the recycled and fresh medium be in the liquid state while the medium removing heat for use elsewhere be gaseous. These are preferences of convenience only.

As stated above, the process and apparatus for heat recovery can be adapted to many reactions. The reaction temperature need only reach a point sufficient to vaporize a portion of the reaction mixture. The control of the heat exchange is generally set at a pressure which is preferable for conducting the particular reaction. Such pressures will be known to those skilled in the art.

If the reaction product begins to decompose under the reaction zone conditions, a situation of which those in the art would be aware, a decomposition product measuring means capable of adjusting the reaction zone conditions to minimize decomposition is incorporated into the system. This is advantageously accomplished by measuring the decomposition product and, if it is beyond acceptable limits, overriding the normal pressure control and allowing the heat exchange in the reactor to remove heat until the decomposition product level falls.

With respect to the ammonium nitrate production process, the feed materials (aqueous nitric acid and liquid or gaseous ammonia) enter a reactor, which is part of a continuous recycling system, preferably in a prewarmed state. The reactor has (1) a zone in which the feed materials are mixed with ammonium nitrate solution which has been recycled and (2) a built in heat exchanger, which is preferably operated with pure water. The reaction mixture is heated by the heat released during the neutralization reaction and, as it flows through the reactor, it gives off part of its heat to the heat exchanger, whereby the water therein is converted to steam and transferred to a collecting drum. The drum circulates the water/steam system and a portion of the steam is removed therefrom, with water being substituted therefore depending on the prevailing reaction conditions. From the reactor, the mixture passes into a separator wherein the vapor phase is removed and the liquid phase is partially recycled and partially transferred for further processing.

The pressure of the vapor removed by the separator is measured by a measuring transducer which generates a control signal to actuate a control mechanism on the steam outlet of the steam collecting drum. As the pressure of the vapor increases beyond that necessary for the reaction, the outlet valve is opened, steam is let off to be used outside the process and fresh unheated water is introduced into the heat exchanger, thereby reducing the heat exchanger temperature and consequently the temperature within the reactor. As the reactor temperature drops, less vapor is produced within the reactor and the pressure developed thereby also drops. The measuring transducer then closes the outlet valve of the collecting drum, resulting in less heat being removed from the reactor. This results in additional vapor being produced in the reactor, thereby increasing the pressure of the vapor as measured by the transducer. In this manner, maximum heat utilization is realized, since only that heat necessary to maintain the reaction is utilized for that purpose and all of the excess heat is diverted to the heat exchanger for use elsewhere. This is so regardless of the fluctuations in the reaction conditions in the system.

Preferably, the recycling system operates with a slight excess of nitric acid in the first neutralization stage. In keeping with this, the first stage reaction neutralizes only 95% to 99.8% of the theoretical amount of nitric acid with ammonia. After the vapor is separated off and the recycled portion is returned to the reactor, the remainder of the ammonium nitrate solution is pressure relieved, preferably to atmospheric pressure and enters another separator. Here additional vapor is separated and the further concentrated solution is passed into another reaction vessel along with sufficient gaseous ammonia to complete the stoichiometric reaction with nitric acid. Any additional vapor which results is separated, yielding an ammonium nitrate concentration of approximately 80% by weight. This solution is then passed to an evaporator where a final concentration of not less than 95% by weight ammonium nitrate is obtained. This final solution can then be processed further such as by drying and pelleting or granulating the product.

The evaporator is operated at a partial vacuum and heated with vapor originating in the first stage reactor. In the process, some of the vapor components condense leaving non-consensable vapor portions in a gaseous phase. These non-condensable portions, which are primarily $N_2O$, are decomposition products of ammonium nitrate.

It is well known that, as result of thermal action, ammonium nitrate decomposes irreversibly into nitrogen monoxide and water. Due to the reaction conditions in the recycling system, a small tolerable amount of decomposition takes place continuously. Therefore, in addition to the pressure regulating mechanism in the first stage set forth above, an additional temperature regulating mechanism is necessary. Measurement of the quantity of the $N_2O$-containing (the non-condensable) gas is a direct measure of the decomposition occurring in the system. Furthermore, in an acidic medium with elevated temperatures, there is a greater danger of this decomposition occurring in an exaplosive manner than when lower temperatures and basic media are used.

Since the reaction conditions favor an explosive decomposition, an additional temperature control, over and above the pressure control is highly desirable.

Therefore, after the vapor has travsersed the evaporator, the decomposition products (the non-condensable gases) are measured and, if a preset level is exceeded, a signal is generated which overrides the pressure responsive control of the first stage reactor heat exchanger. So long as the non-condensable gases are above the acceptable level, the overriding signal continues, venting off steam so as to quickly reduce the temperature in the reactor. As a consequence, less vapor is formed and the concentration of ammonium nitrate in the recycling system falls. Both the drops in temperature and the dilution of the aqueous ammonium nitrate solution prevent the decomposition of the ammonium nitrate in a simple and effective manner without having to interrupt the manufacturing process. As soon as the level of non-condensable gases is reduced to within acceptable amounts, the overriding signal is terminated and the normal pressure controlled mechanism operates.

The invention will be more completely described with reference to the accompanying figure which is illustrative only and does not limit the scope of the invention. In the accompanying drawing, in which like reference characters indicate like parts, FIG. 1 is a flow diagram of the apparatus used to carry out the process of preparing ammonium nitrate in accordance with the invention.

DETAILED DESCRIPTION OF THE PREFERRED EMBODIMENT

Figure 1:
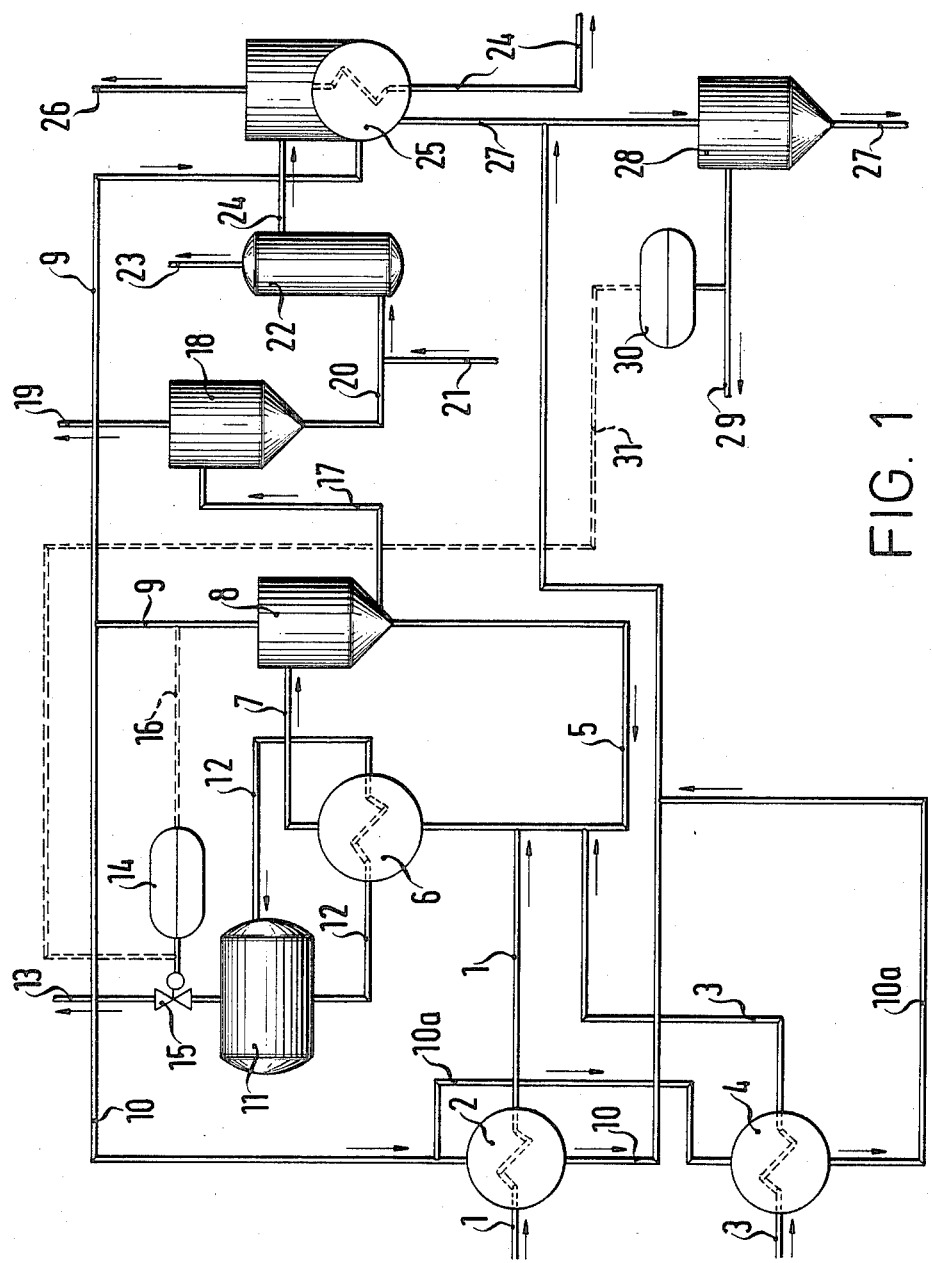

Gaseous or liquid ammonia is fed into the recycling system via line 1, which passes through heat exchanger 2. Aqueous nitric acid enters the system via line 3, which passes through exchanger 4. Heat exchanger vessel 6 serves as a reactor, and material leaving reactor 6 passes through pipe 7 into separator 8. A portion of the liquid components is recycled to the reactor from separator 8 through pipe 5. Reactor 6 has contained therein a tubular heat exchanger, which is supplied with water via line 12 from the lower portion of steam collecting drum 11. The water enters the tubular heat exchanger and is evaporated, passing up into steam collecting drum 11 in the form of steam through the ascending branch of line 12. At the head of the steam collecting drum, line 13 is positioned to remove steam from collecting drum 11. Control valve 15 is installed in line 13 and is present to regulate the amount of steam removed.

The prewarmed feed materials, ammonia and aqueous nitric acid, enter the ascending section of pipe 5 and flow upward. Together with the recycling ammonium nitrate, they enter reactor 6 and the heat of the neutralization reaction is released. Part of this released heat is used to generate steam through the tubular heat exchanger present in the reactor.

The reaction mixture, consisting of ammonium nitrate, water, as well as any remaining feed materials which have not fully reacted, leaves reactor 6 and enters separator 8 through pipe 7. Here it is separated into liquid components and vapor, the vapor being taken off through line 9. The vapor in line 9 has a pressure corresponding to the reaction conditions prevailing in the recycling system. Pressure control 14 is responsive for activating control valve 15 and is connected to line 9 by stepping line 16.

Pressure developed within line 9 activates pressure control 14 to open or close control valve 15. Excess pressure in line 9 indicates the temperature within the reactor is to high and control valve 15 is opened, thereby removing heat from the reactor, which in turn reduces the amount of vapor produced therein and, consequently, reduces the pressure in line 9. Similarly, when the pressure in line 9 falls below the acceptable level, control valve 15 is closed, thereby retaining heat within reactor 6 resulting in increased vapor production therein and increasing the pressure within line 9.

As stated earlier, part of the liquid components in separator 8 is recycled to reactor 6. The remainder of the liquid components is transferred through line 17 to separator 18 which operates under normal atmospheric pressure. Vapor released during this operation is passed off through line 19 and is used to preheat feed materials through heat exchangers (not shown). The concentrated ammonium nitrate solution leaves separator 18 through line 20 and is mixed with additional ammonia introduced through line 21. The mixture then enters vessel 22 and any vapor formed therein escapes through line 23.

The relatively highly concentrated ammonium nitrate solution then passes through line 24 into a falling film evaporator 25 containing a heat exchanger in the form of a tube bundle. The ammonium nitrate melt flows through the tubes of the tube bundle and the finished product leaves the evaporator via line 24a. Vapor formed in the evaporator is removed at a pressure of approximately 0.4 bar via line 26.

Vapor originating in separator 8, after passing stepping line 16, continues in line 9 to warm evaporator 25 or is passed through lines 10 and 10a to preheat the feed materials prior to their entering the reactor. After the vapor in lines 9, 10, and 10a has given up its heat to evaporator 25, line 1, and/or line 3, the condensed portions and non-condensed gases are passed via line 27 into separator 28. The condensed portions continue out of the bottom of the separator through line 27.

The gases which have not yet been condensed emerge from separator 28 through line 29 and are measured by measuring device 30. If the quantity of non-condensed gases exceeds the appropriate level, a signal is generated via stepping line 31 which overrides the signal generated from pressure control 14 and opens control valve 15. This quickly reduces the temperature in the reactor and decreases the concentration of the ammonium nitrate solution. As a consequence, the decomposition of ammonium nitrate decreases, resulting in a decrease of the decomposition gases present in line 29. When the decomposition gas level falls below the stated tolerable level, the signal generated by measuring device 30 is terminated and pressure control 14 resumes operation of control valve 15.

What is claimed is:

1. A process for the preparation of ammonium nitrate comprising
   (a) reacting 0.2 to 5% excess nitric acid and ammonia in a first step at a pressure of 3.4 to 4.8 bar with the production of reaction steam while circulating the reaction mixture in the first step through a heat exchange system provided with a throttle valve to generate additional steam
   (b) neutralizing the remaining excess nitric acid with ammonia in a second step at atmospheric pressure
   (c) measuring the reaction steam pressure leaving the first step and if the reaction steam pressure exceeds a preset value between 3.4 and 4.8 bar, more steam is released from the heat exchange system and if the reaction steam pressure falls below a preset value of 3.4 to 4.8 bar, the steam from the heat recovery system is throttled until the reaction steam pressure increases to the preset level
   (d) monitoring the uncondensable decomposition products of the reaction and when said products exceed a preset value, the heat recovery system throttle valve is opened quickly until the level of decomposition products falls below the preset level,
   (e) using the reaction steam to concentrate the ammonium nitrate solution and preheat the starting materials.

2. The process of claim 1 wherein the nitric acid is neutralized in the first step at 172° to 185° C.

3. The process of claim 1 wherein the second step neutralization is effected at 125° to 130° C. in the presence of an aqueous 78 to 82% ammonium nitrate solution.

* * * * *